US011617474B1

(12) United States Patent
Williams et al.

(10) Patent No.: US 11,617,474 B1
(45) Date of Patent: *Apr. 4, 2023

(54) LID AND BLADE ASSEMBLY FOR A MICRO PUREE MACHINE

(71) Applicant: SharkNinja Operating LLC, Needham, MA (US)

(72) Inventors: Helen Williams, London (GB); Sam William Bannister, London (GB); Lukas Tubby, Needham, MA (US); Ryan Michienzi, Needham, MA (US); Max He, Needham, MA (US); Ping Chu, Needham, MA (US)

(73) Assignee: SHARKNINJA OPERATING LLC, Needham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/829,945

(22) Filed: Jun. 1, 2022

Related U.S. Application Data

(63) Continuation of application No. 17/747,099, filed on May 18, 2022.

(51) Int. Cl.
  *A47J 43/07* (2006.01)
  *A47J 43/044* (2006.01)
(52) U.S. Cl.
  CPC ......... *A47J 43/0711* (2013.01); *A47J 43/044* (2013.01); *A47J 2043/0449* (2013.01)
(58) Field of Classification Search
  CPC .. A47J 43/044; A47J 43/0711; A47J 43/0722; A47J 2043/0449; A47J 2043/04436
  See application file for complete search history.

(56) References Cited

U.S. PATENT DOCUMENTS

| | | | |
|---|---|---|---|
| 2,472,188 A | 6/1949 | Bennett et al. |
| 2,565,226 A | 8/1951 | Gross, Jr. |
| 3,505,075 A | 4/1970 | Black |
| 4,183,680 A | 1/1980 | Manfroni |
| 4,547,076 A | 10/1985 | Maurer |
| 4,701,054 A | 10/1987 | Cipellei |

(Continued)

FOREIGN PATENT DOCUMENTS

| | | |
|---|---|---|
| CN | 87201657 U | 2/1988 |
| CN | 1032121 | 4/1989 |

(Continued)

OTHER PUBLICATIONS

Extended European Search Report in Application No. 22185046.4 dated Dec. 14, 2022 (8 pgs).

*Primary Examiner* — Shelley M Self
*Assistant Examiner* — Jared O Brown
(74) *Attorney, Agent, or Firm* — Burns & Levinson, LLP; Joseph M. Maraia

(57) ABSTRACT

A lid and blade assembly for a micro puree machine includes a lid having a central aperture for receiving a central hub of the blade. At least two cutting arms and at least two mixing arms extend radially outward from the central hub. A retaining component retains the blade within the lid during processing. The lid includes a recess below the retaining component for collecting slush and ice displaced by the blade during processing. Portions of the blade also include serrated grooves for clearing slush deposits when the blade engages the lid.

13 Claims, 7 Drawing Sheets

(56) References Cited

U.S. PATENT DOCUMENTS

| | | | |
|---|---|---|---|
| 4,930,709 A | 6/1990 | Steffens | |
| 6,394,373 B1 | 5/2002 | Morris | |
| 6,474,862 B2 | 11/2002 | Farrell | |
| 6,772,675 B2 | 8/2004 | Ervin | |
| 7,621,476 B2 | 11/2009 | Jakobi et al. | |
| 8,794,133 B2 | 8/2014 | Fister et al. | |
| 9,004,608 B1 | 4/2015 | Charbonneau | |
| 9,149,156 B2 * | 10/2015 | Rosenzweig | A47J 43/04 |
| 9,357,883 B2 | 6/2016 | Lee et al. | |
| 10,443,917 B2 | 10/2019 | Kim | |
| 10,743,561 B2 | 8/2020 | Smith | |
| 10,874,132 B2 | 12/2020 | Nortey et al. | |
| 11,154,163 B1 * | 10/2021 | He | A47J 43/044 |
| 2005/0086814 A1 | 4/2005 | Huang | |
| 2005/0167537 A1 * | 8/2005 | Chen | A47J 43/0711 241/292.1 |
| 2005/0183426 A1 | 8/2005 | Learned | |
| 2006/0243838 A1 | 11/2006 | Nakato | |
| 2007/0297282 A1 | 12/2007 | Procuranti | |
| 2012/0189746 A1 * | 7/2012 | DeLong | A47J 36/165 99/324 |
| 2014/0252146 A1 * | 9/2014 | Audette | A47J 43/0716 366/144 |
| 2015/0174586 A1 | 6/2015 | Lipowski | |
| 2015/0272394 A1 | 10/2015 | Lin | |
| 2015/0308062 A1 | 10/2015 | Charbonneau | |
| 2015/0308063 A1 | 10/2015 | Charbonneau | |
| 2016/0045073 A1 | 2/2016 | Kozlowski et al. | |
| 2018/0213980 A1 * | 8/2018 | Cody | A47J 43/07 |
| 2021/0039609 A1 | 2/2021 | Wangler et al. | |
| 2021/0106958 A1 | 4/2021 | Medici | |
| 2022/0142409 A1 | 5/2022 | Beckstrom et al. | |
| 2022/0225830 A1 * | 7/2022 | Verbrugge | A47J 43/082 |

FOREIGN PATENT DOCUMENTS

| | | |
|---|---|---|
| CN | 1005898 B | 11/1989 |
| CN | 2684699 Y | 3/2005 |
| CN | 1933910 | 3/2007 |
| CN | 100509167 C | 7/2009 |
| CN | 201404045 Y | 2/2010 |
| CN | 201414376 Y | 3/2010 |
| CN | 101889623 A | 11/2010 |
| CN | 102078149 A | 6/2011 |
| CN | 201987368 U | 9/2011 |
| CN | 102605735 A | 7/2012 |
| CN | 102655794 A | 9/2012 |
| CN | 202408593 U | 9/2012 |
| CN | 202819518 U | 3/2013 |
| CN | 202890392 U | 4/2013 |
| CN | 103168908 A | 6/2013 |
| CN | 103190520 A | 7/2013 |
| CN | 203152409 U | 8/2013 |
| CN | 203152410 U | 8/2013 |
| CN | 203174549 U | 9/2013 |
| CN | 103480470 A | 1/2014 |
| CN | 203608787 U | 5/2014 |
| CN | 203801633 U | 9/2014 |
| CN | 204520414 U | 8/2015 |
| CN | 105214552 A | 1/2016 |
| CN | 205308187 U | 6/2016 |
| CN | 105815531 A | 8/2016 |
| CN | 205585245 U | 9/2016 |
| CN | 207220039 U | 9/2017 |
| CN | 206620790 U | 11/2017 |
| CN | 206761571 U | 12/2017 |
| CN | 206761572 U | 12/2017 |
| CN | 206761573 U | 12/2017 |
| CN | 206761574 U | 12/2017 |
| CN | 108991950 A | 12/2018 |
| CN | 109123054 A | 1/2019 |
| CN | 109195695 | 1/2019 |
| CN | 208523680 U | 2/2019 |
| CN | 209171342 U | 7/2019 |
| CN | 211091708 U | 7/2020 |
| CN | 211739597 U | 10/2020 |
| CN | 112041094 A | 12/2020 |
| CN | 112312806 | 2/2021 |
| CN | 213454405 U | 6/2021 |
| CN | 213793253 U | 7/2021 |
| CN | 214250243 U | 9/2021 |
| CN | 215638179 U | 1/2022 |
| DE | 102018119811 | 6/2019 |
| EP | 0161679 A | 11/1985 |
| EP | 0308666 A1 | 3/1989 |
| EP | 0891139 A1 | 1/1999 |
| EP | 1156735 B1 | 11/2001 |
| EP | 1680228 B1 | 5/2008 |
| EP | 2335535 A1 | 6/2011 |
| EP | 2512312 A2 | 10/2012 |
| EP | 2820987 | 1/2015 |
| EP | 3369353 A1 | 9/2018 |
| EP | 3787808 A1 | 3/2021 |
| ES | 1071424 U | 3/2010 |
| ES | 1071426 U | 8/2011 |
| KR | 2020130004981 | 8/2013 |
| WO | 1997/036498 A1 | 10/1997 |
| WO | 2005/072879 A1 | 8/2005 |
| WO | 2011/073873 A3 | 9/2011 |
| WO | WO2011113970 | 9/2011 |
| WO | 2017/166008 A1 | 10/2017 |
| WO | WO2018007833 | 1/2018 |
| WO | WO2018085369 | 5/2018 |
| WO | 2018/223555 A1 | 12/2018 |
| WO | 2019/200490 A1 | 10/2019 |
| WO | 2019/200491 A1 | 10/2019 |
| WO | 2019/210934 A1 | 11/2019 |
| WO | 2022/020653 A1 | 1/2022 |

* cited by examiner

LID AND BLADE ASSEMBLY FOR A MICRO PUREE MACHINE

CROSS-REFERENCE TO RELATED APPLICATIONS

This application is a continuation of U.S. application Ser. No. 17/747,099, filed May 18, 2022, entitled LID AND BLADE ASSEMBLY FOR A MICRO PUREE MACHINE, the entire contents of which are incorporated herein by reference for all purposes.

FIELD OF THE INVENTION

The present disclosure relates to a food processing device and, more particularly, to a lid and blade assembly of a micro puree machine for making frozen foods and drinks.

BACKGROUND

Home use machines that are intended to make ice creams, gelatos, frozen yogurts, sorbets and the like are known in the art. Typically, a user adds a series of non-frozen ingredients to a beaker. The ingredients are then churned by a paddle while a refrigeration mechanism simultaneously freezes the ingredients. These devices have known shortcomings including, but not limited to, the amount of time and effort required by the user to complete the ice cream making process. Machines of this nature are impractical for preparing most non-dessert food products.

An alternative type of machine known to make a frozen food product is a micro-puree machine. Typically, machines of this nature spin and plunge a blade into a pre-frozen ingredient or combination of ingredients. While able to make frozen desserts like ice creams, gelatos, frozen yogurts, sorbets and the like, micro puree style machines can also prepare non-dessert types of foods such as non-dessert purees and mousses. In addition, consumers can prepare either an entire batch of ingredients or a pre-desired number of servings. However, a problem with current micro puree machines occurs when low sugar recipes result in buildup of ice around the blade. This can cause blade detection sensors to believe that the blade is installed in the device when it is not, potentially leading to product failures and misuse.

SUMMARY

This disclosure describes a lid and blade assembly for a micro puree machine that addresses the problem of ice buildup around the blade during processing. The lid includes a central aperture for receiving a central hub of the blade. At least two cutting arms and at least two mixing arms extend radially outward from the central hub. A retaining component retains the blade within the lid during processing. Advantageously, the lid may include a recess below the retaining component for collecting slush and ice displaced by the blade during processing. Portions of the blade may also include serrated grooves for clearing slush deposits when the blade engages the lid.

Embodiments of the lid and blade assembly of this disclosure may include one or more of the following, in any suitable combination.

In some embodiments, the lid and blade assembly of this disclosure includes a blade having a central support hub including an angled ledge. The blade also includes at least one cutting member extending outward from a circumferential surface of the central support hub and an engagement surface extending at least partially around a circumference of the central support hub. The assembly also includes a lid having an upper surface, a lower surface and at least one retaining component between the upper and lower surfaces. The lower surface includes a wall defining at least one recess below the at least one retaining component. The lid further defines an aperture for coupling to the central support hub of the blade. When the central support hub is coupled to the aperture, a portion of the at least one retaining component engages the engagement surface.

In further embodiments, the at least one recess defines a volume arranged to receive a portion of processed material displaced by the central support hub. In embodiments, the lid includes a plurality of rails extending along opposing sides of the at least one recess. In embodiments, the angled ledge of the central support hub defines a first plurality of serrated grooves. In embodiments, an overhang of the first plurality of the serrated grooves is less than an overhang of a remainder of the angled ledge. In embodiments, the blade comprises at least two cutting arms and at least two mixing arms. In embodiments, the at least two cutting arms define a second plurality of serrated grooves.

In yet further embodiments, the central support hub defines an opening for accepting a mixing shaft of the micro puree machine. In embodiments, the engagement surface is an undercut defined by a lower surface of the angled ledge. In embodiments, the at least one retaining component is spring biased towards the aperture. In embodiments, the lid is coupleable to a beaker of the micro puree machine. In embodiments, the beaker contains one or more pre-frozen ingredients for processing by the micro puree machine. In embodiments, the blade comprises a unitary structure. In embodiments, the lid further comprises a release lever arm for engaging the at least one retaining component. In embodiments, the engagement surface extends radially outward at a 90-degree angle relative to a central axis of the central support hub.

In some embodiments, a lid of a micro puree machine of this disclosure includes an upper surface, a lower surface and at least one retaining component between the upper and lower surfaces. The lower surface includes a wall defining at least one recess below the at least one retaining component. The lid further defines an aperture for coupling to a central support hub of a blade. The at least one recess defines a volume arranged to receive a portion of processed material displaced by the central support hub. In embodiments, the at least one retaining component is spring biased towards the aperture. In embodiments, the lid is coupleable to a beaker of the micro puree machine.

In some embodiments, a blade for a micro puree machine of this disclosure includes a central support hub having an angled ledge and at least one cutting member extending outward from a circumferential surface of the central support hub. The angled ledge defines a first plurality of serrated grooves. In embodiments, an overhang of the first plurality of serrated grooves is less than an overhang of a remainder of the angled ledge. In embodiments, the at least one cutting member comprises at least two cutting arms and at least two mixing arms. The at least two cutting arms define a second plurality of serrated grooves.

A reading of the following detailed description and a review of the associated drawings will make apparent the advantages of these and other features. Both the foregoing general description and the following detailed description serve as an explanation only and do not restrict aspects of the disclosure as claimed.

BRIEF DESCRIPTION OF THE DRAWINGS

Reference to the detailed description, combined with the following figures, will make the disclosure more fully understood, wherein.

DETAILED DESCRIPTION

Figure 1:
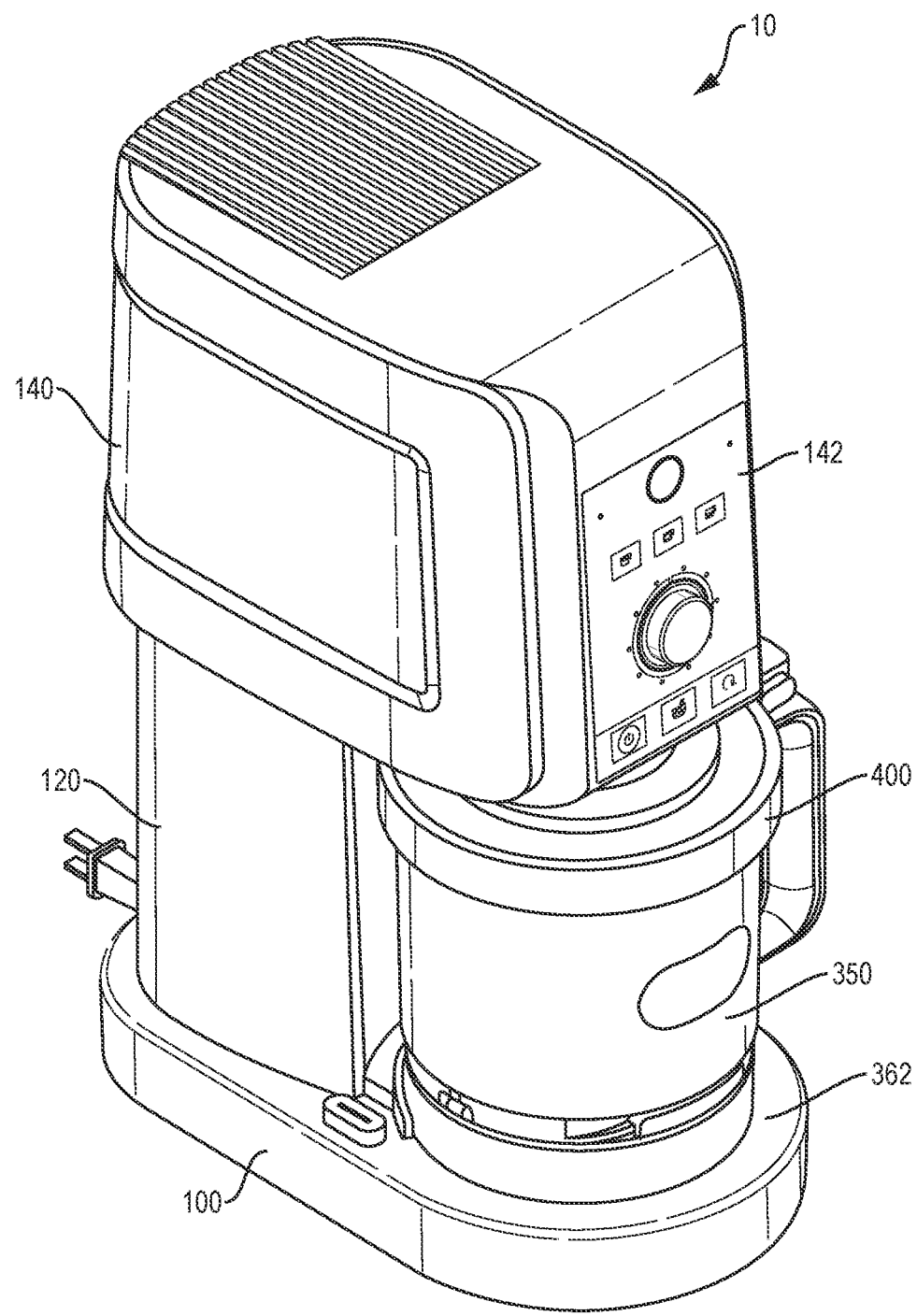
FIGS. 1 and 2 show a micro puree machine of this disclosure according to some embodiments.

In the following description, like components have the same reference numerals, regardless of different illustrated embodiments. To illustrate embodiments clearly and concisely, the drawings may not necessarily reflect appropriate scale and may have certain features shown in somewhat schematic form. The disclosure may describe and/or illustrate features in one embodiment, and in the same way or in a similar way in one or more other embodiments, and/or combined with or instead of the features of the other embodiments.

In the specification and claims, for the purposes of describing and defining the invention, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts. Use of the terms "top," "bottom," "above," "below" and the like helps only in the clear description of the disclosure and does not limit the structure, positioning and/or operation of the feed chute assembly in any manner.

FIG. 1 shows an isometric view of a micro puree machine 10 according to an exemplary embodiment of the present disclosure. The micro puree machine 10 may include a lower housing or base 100 and an upper housing 140. A middle housing 120 may extend between the lower housing 100 and upper housing 140. The upper housing 140 may include an interface 142 for receiving user inputs to control the micro puree machine 10 and/or display information. The micro puree machine 10 may also include a removable beaker 350 and a lid 400 coupled to the beaker 350. The beaker 350 may contain one or more pre-frozen ingredients for processing. A user may place the beaker 350 and the lid 400 on the lower housing 100. The user then may rotate the beaker 350 and the lid 400 on a lifting platform 362 from a down position to an up position, and vice versa.

Figure 2:
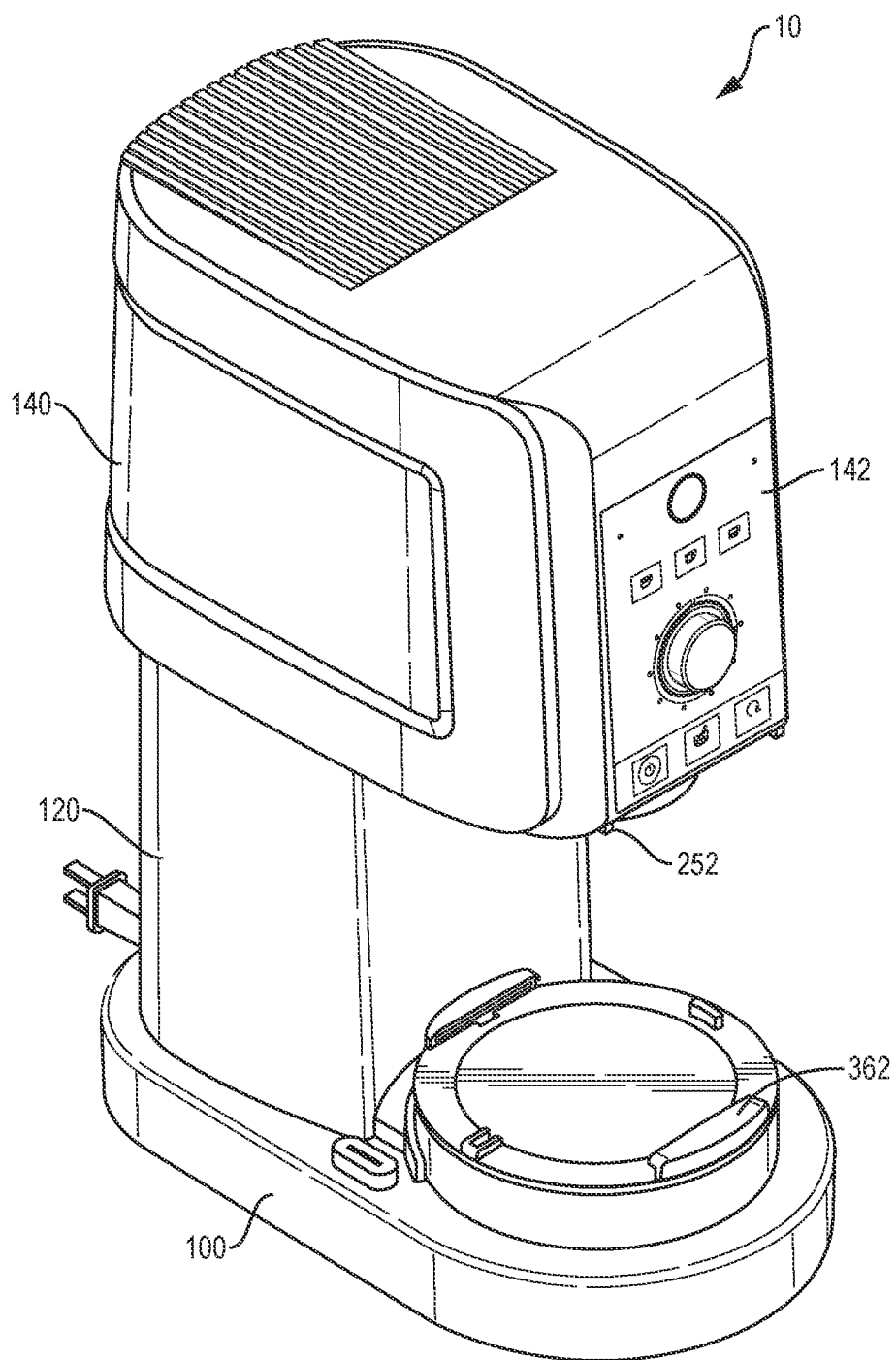

FIG. 2 shows the micro puree machine 10 of FIG. 1 with the beaker 350 removed for ease of illustration. When the user raises the beaker 350 and the lid 400 vertically to the up position, a blade 300 (FIG. 3A) within the lid 400 engages with a mixing shaft 252 extending from the upper housing 140. The mixing shaft 252 delivers a rotational force to the blade 300 to spin one or more blades 301, 302, 303, 304 as they engage with ingredients inside the beaker 350. Further non-limiting embodiments of the micro puree machine 10 are described in U.S. Pat. No. 11,154,163 to SharkNinj a Operating, LLC (Needham, Mass.), the contents of which are incorporated herein by reference in their entirety.

Figure 3A:
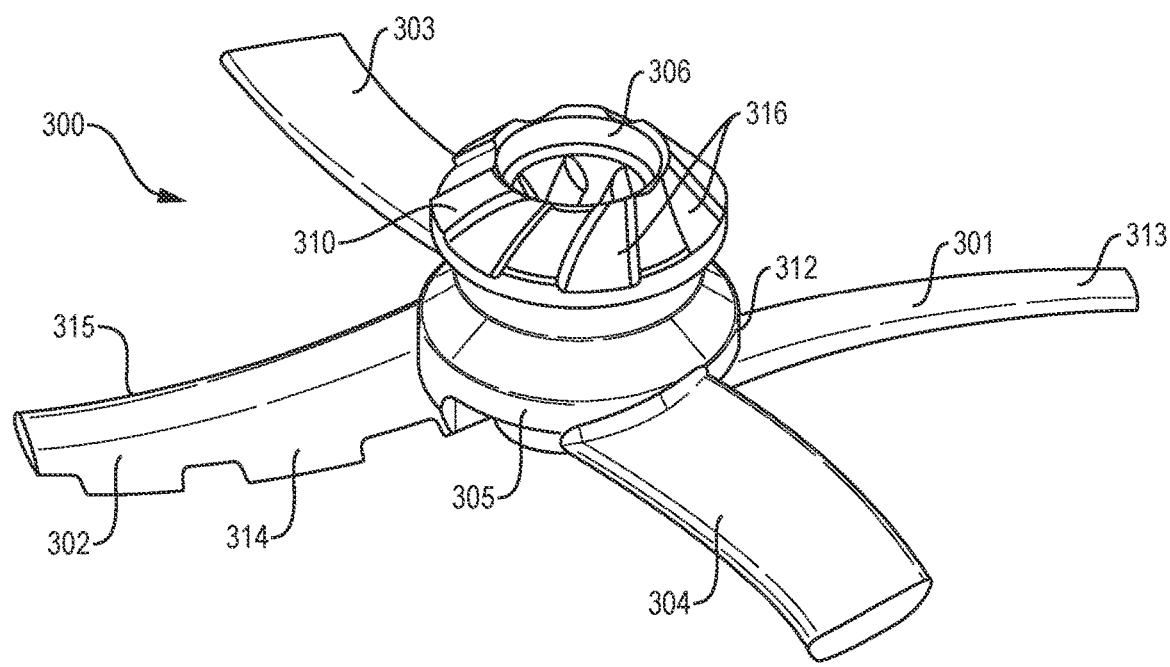
FIGS. 3A-F show various configurations of the blade assembly of this disclosure with serrated grooves according to some embodiments.

FIG. 3A shows an isometric view of an embodiment of the blade 300 of this disclosure. Embodiments of the blade 300 can comprise a unitary structure or distinct structures joined together either directly or indirectly. In embodiments, the material of the blade 300 may comprise cast stainless steel with a PVD titanium coating. The blade 300 may comprise one or more cutting arms 301, 302 (for example, two as shown) and one or more mixing arms 303, 304 (for example, two as shown). The blade 300 may further comprise a central support hub 305. The cutting arms 301, 302 and the mixing arms 303, 304 extend outward from the central support hub 305. The central support hub 305 may define a central opening 306 for accepting the mixing shaft 252 (FIG. 2). The cutting arms 301 and 302 may comprise a horizontally extending length having a proximal end 312 and a distal end 313. The proximal end 312 meets the central support hub 305. The cutting arms 301, 302 may also comprise a leading edge 314 and a following edge 315. Likewise, mixing arms 303, 304 extend from the central support hub 305 and are generally positioned in an opposing orientation. In embodiments, the cutting arms 301, 302 and the mixing arms 303, 304 may have a curvature extending along all or at least a portion of the length of the arms 301, 302, 303, 304 in a concave configuration in relation to a direction of rotation during use.

Still referring to FIG. 3A, embodiments of the central support hub 305 may also comprise an angled external ledge 310. The ledge 310 may include a plurality of features for clearing slush deposits when the blade 300 is engaged with the lid 400. For example, a top surface of the ledge 310 may define a series of serrated grooves 316 alternating in depth around the circumference of the ledge 310. As the blade 300 retracts into the lid 400, the serrated grooves increase the contact area between the blade 300 and the ice, allowing more ice to be sloughed off the blade 300.

Figure 3B:
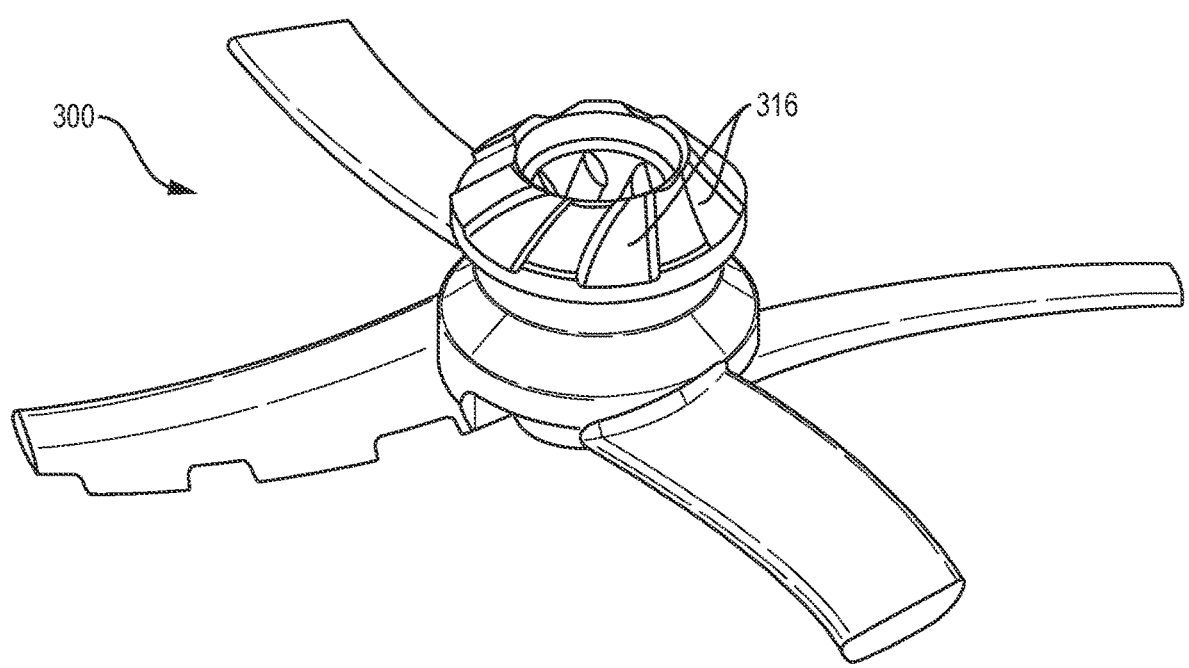
Figure 3C:
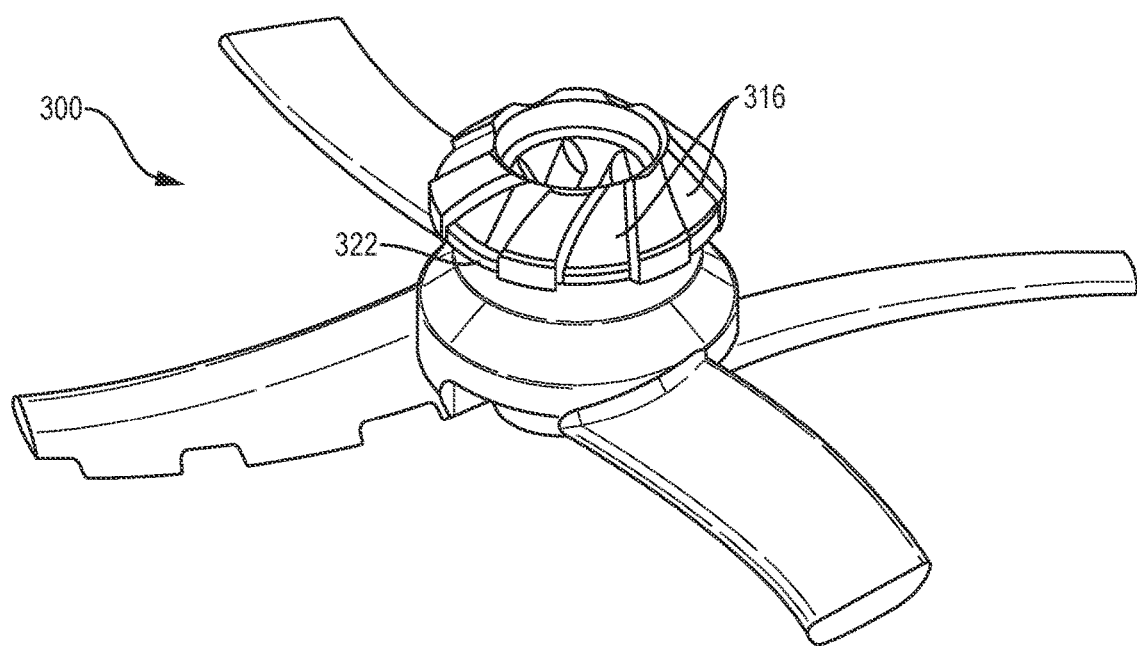
Figure 3D:
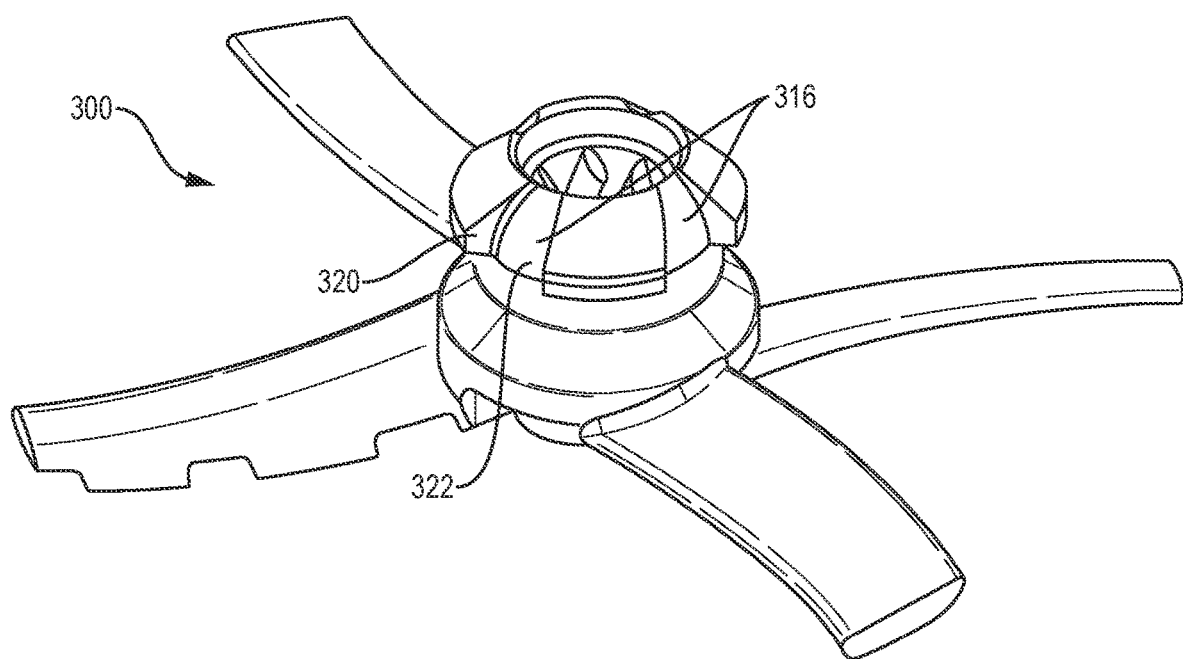
Figure 3E:
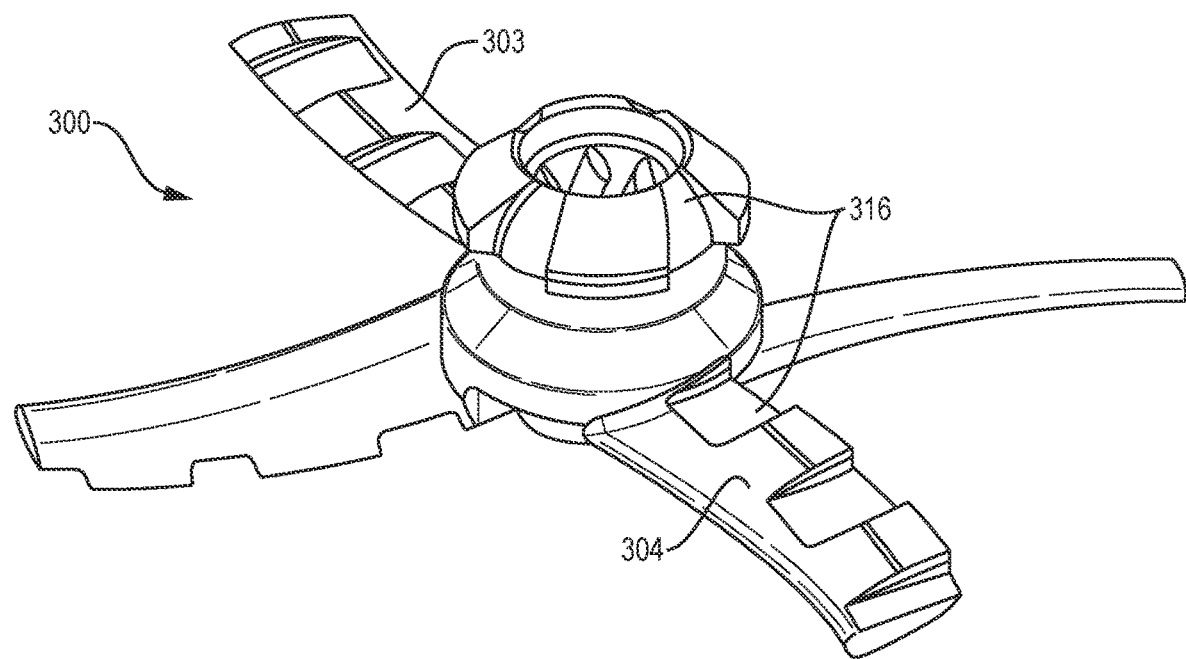
Figure 3F:
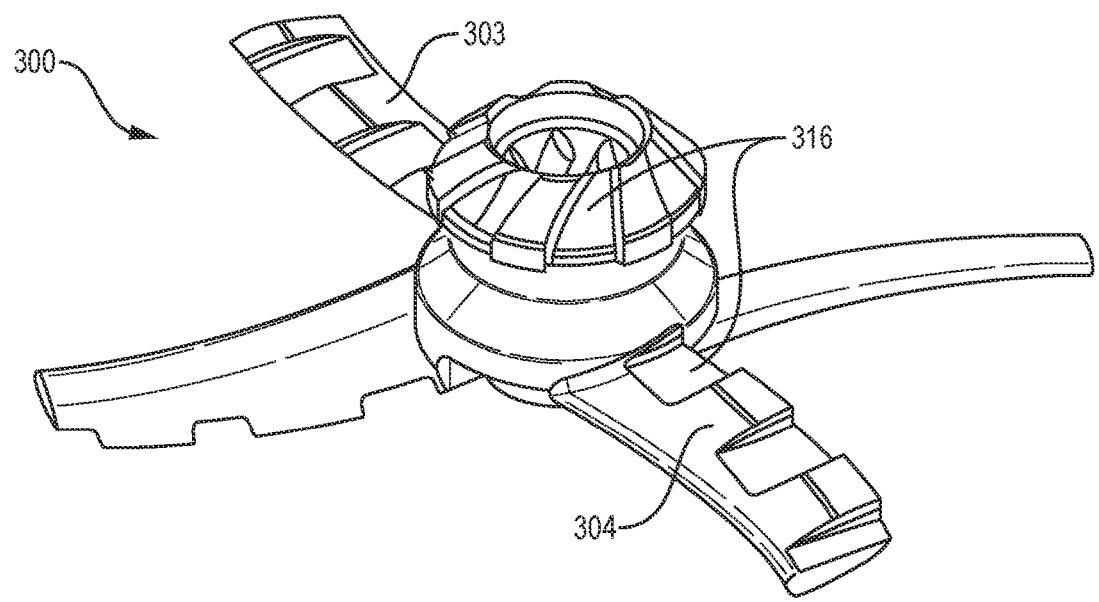

Various configurations of the serrated grooves 316 are shown in FIGS. 3B-D. As in FIG. 3A, the ledge 310 in FIGS. 3B-D includes the plurality of serrated grooves 316. For example, in FIG. B, the serrated grooves 316 have an increased depth to improve the cutting action as the blade 300 retracts through the slush. In FIG. C, an outer diameter of an overhang 322 of the serrated grooves 316 is reduced with respect to the remainder of the ledge 310 to improve the cutting action and to free up space around the blade 300 for ice to fall away. In FIG. D, the outer diameter of the overhang 322 of the serrated grooves 316 is reduced even further to allow for ice to fall, and to increase the size of the cutting teeth 320. In other embodiments, shown in FIGS. 3E and 3F, both the ledge 310 and the mixing arms 303, 304 include the serrated grooves 316 for increased moving of ice away from the blade 300.

Figure 4A:
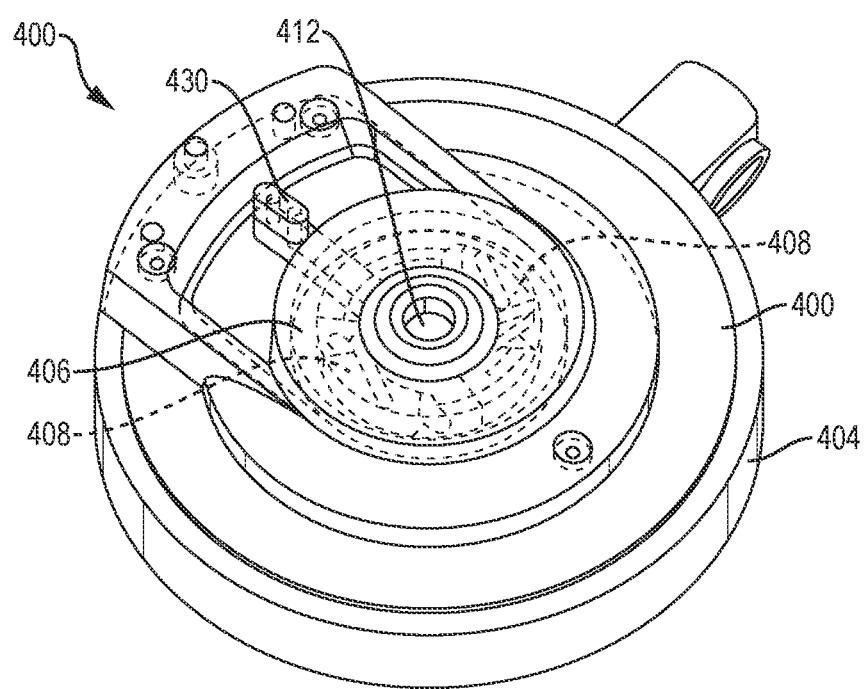
FIGS. 4A and 4B show the lid of this disclosure in a top view (FIG. 4A) and a bottom view (FIG. 4B) according to some embodiments.
Figure 4B:
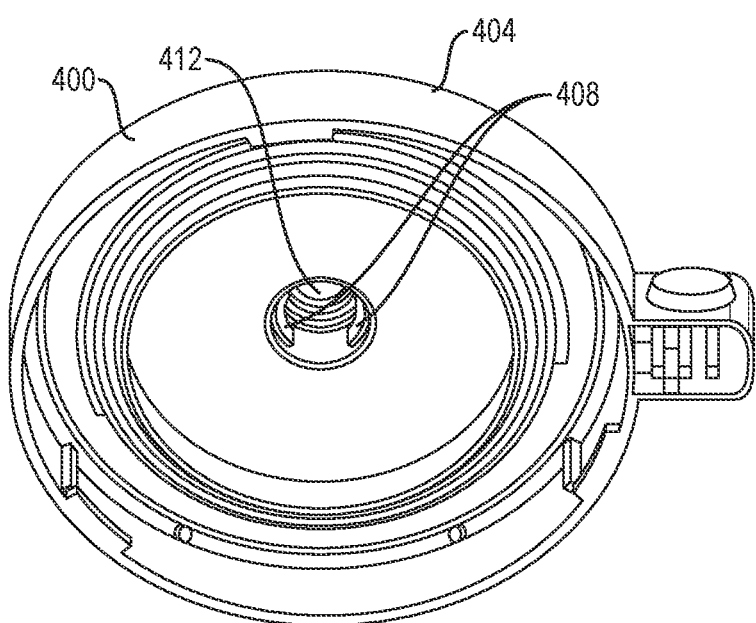

FIGS. 4A and 4B show top and bottom views respectively of the lid 400 of this disclosure according to some embodiments. The lid 400 may include a lid 404, two opposing retaining components 408, and a release lever arm 430 for engaging with and disengaging from the retaining components 408 with the blade 300. A central aperture 412 of the lid 400 may receive the central support hub 305 (FIG. 3A) of the blade 300. The retaining components 408 may be spring biased toward the aperture 412 by at least one spring (not shown). In embodiments, the springs may be extended and attached to the retaining components 408 such that the springs tend to pull the retaining components 408 toward each other.

Figure 4C:
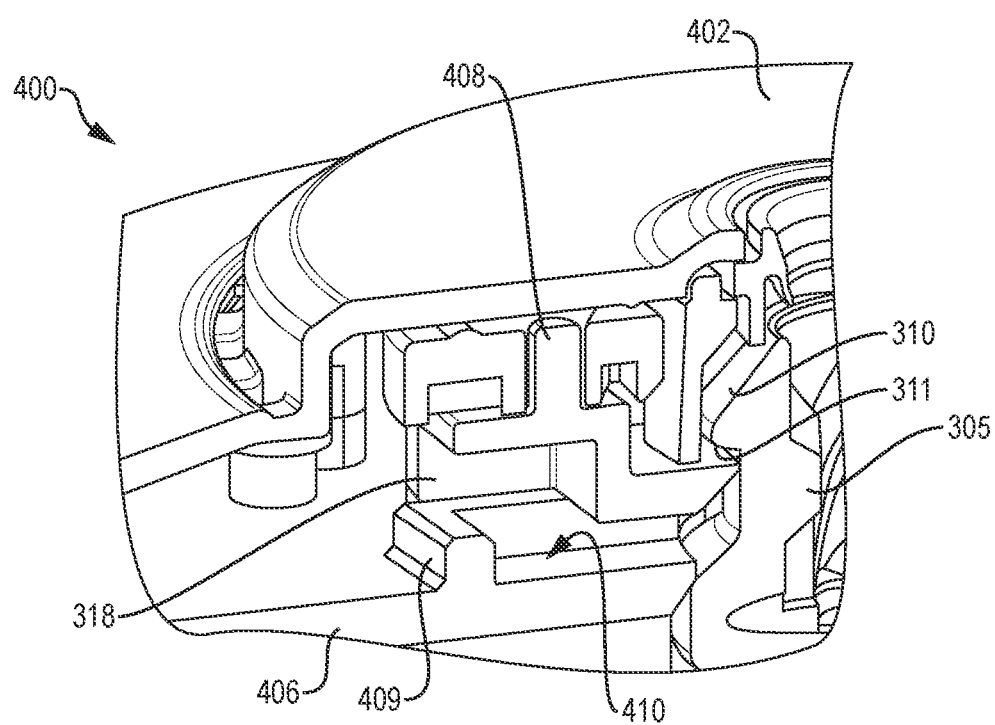
FIG. 4C shows a cross-sectional view of the lid and blade assembly of this disclosure according to some embodiments.

FIG. 4C shows a cross-sectional view of the lid 400 engaged with the central support hub 305 of the blade 300. As shown in FIG. 4C, in embodiments, the lid 400 may include an upper surface 402 and a lower surface 406. Between the upper surface 402 and the lower surface 406, embodiments of the retaining components 408 may engage with an undercut 311 of the central support hub 305. In embodiments, the undercut 311 is defined by a lower surface of the ledge 310. The undercut 311 may extend radially outward at an approximately 90-degree angle relative to a central axis of the central support hub 305. The retaining components 408 may engage with the undercut 311 in a manner that retains the blade 300 in the lid 400 during processing. The lower surface 406 may furthermore include a wall 409 defining at least one recess 410 below the retaining components 408. Advantageously, the recess 410 defines a volume for collecting slush and ice displaced by the central support hub 305 during processing. This collection reduces build-up of the slush and ice around the central support hub 305, which may result in product failures and misuse.

Figure 4D:
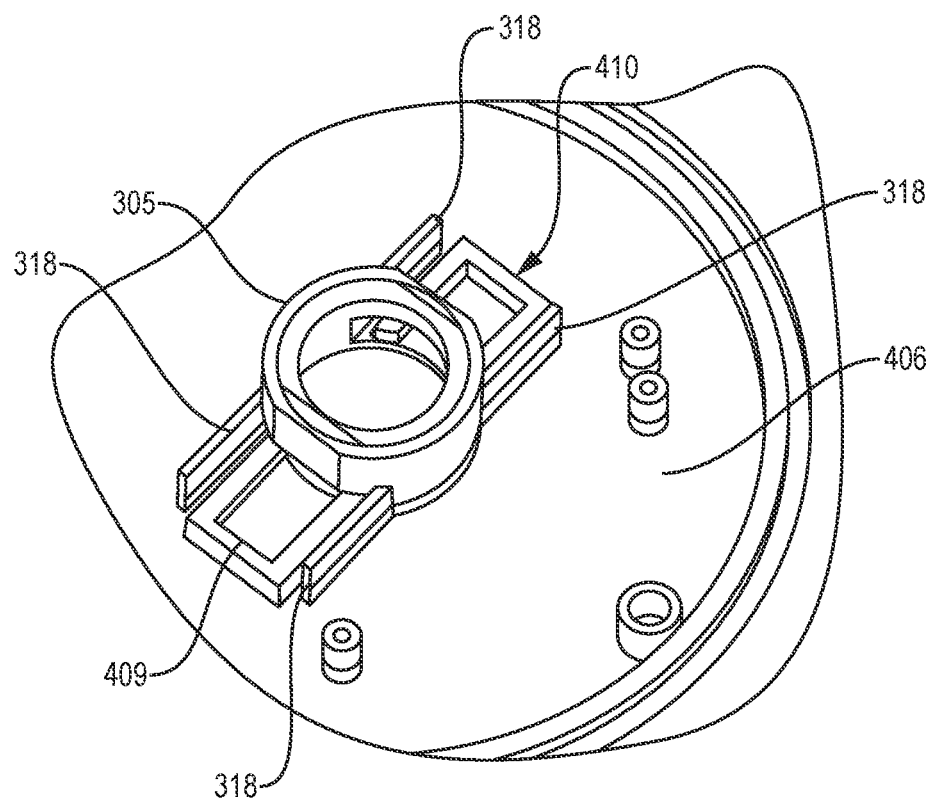
FIG. 4D shows a detailed view of the lid of this disclosure according to some embodiments.

FIG. 4D shows a detailed view of the lower surface 406 of the lid 400 and the recess 410. In embodiments, the lower surface 406 of the lid 400 may further include a plurality of outwardly extending rails 318, which may be four rails 318 as shown. Each rail 318 extends on opposing sides of the recess 410. The rails 318 act as guides for the retaining components 408, ensuring that the retaining components 408 can only move back and forth linearly. The recess 410 furthermore lifts the retaining components 408 off the lower surface 406 to reduce the friction between the retaining components 408 and the lower surface 406 to enable free movement of the retaining components 408 and to prevent the retaining components 408 from becoming stuck. The disclosure also contemplates that, in embodiments where the lid 400 does not include rails 318, the wall 409 of the recess 410 may serve the function of the rails 318.

While the disclosure particularly shows and describes preferred embodiments, those skilled in the art will understand that various changes in form and details may exist without departing from the spirit and scope of the present application as defined by the appended claims. The scope of this present application intends to cover such variations. As such, the foregoing description of embodiments of the present application does not intend to limit the full scope conveyed by the appended claims.

The invention claimed is:

1. A lid and blade assembly for a micro puree machine, the lid and blade assembly, comprising:
    a blade comprising:
        a central support hub having an angled ledge;
        at least one cutting member extending outward from a circumferential surface of the central support hub; and
        an engagement surface extending at least partially around a circumference of the central support hub; and
    a lid having an upper surface, a lower surface and at least one retaining component between the upper and lower surfaces, the lower surface including a wall defining at least one recess below the at least one retaining component, the lid further defining an aperture for coupling to the central support hub of the blade;
    wherein, when the central support hub is coupled to the aperture, the at least one retaining component engages the engagement surface; and
    wherein the at least one retaining component is spring biased towards the aperture.

2. The lid and blade assembly of claim 1, wherein the at least one recess defines a volume arranged to receive a portion of processed material displaced by the central support hub.

3. The lid and blade assembly of claim 1, wherein the lid includes a plurality of rails extending along opposing sides of the at least one recess.

4. The lid and blade assembly of claim 1, wherein the angled ledge of the central support hub defines a first plurality of serrated grooves.

5. The lid and blade assembly of claim 4, wherein an overhang of the first plurality of serrated grooves is less than an overhang of a remainder of the angled ledge.

6. This lid and blade assembly of claim 1, wherein the at least one cutting member comprises at least two cutting arms and at least two mixing arms.

7. The lid and blade assembly of claim 6, wherein the at least two cutting arms define a second plurality of serrated grooves.

8. The lid and blade assembly of claim 1, wherein the central support hub defines an opening for accepting a mixing shaft of the micro puree machine.

9. The lid and blade assembly of claim 1, wherein the engagement surface is an undercut defined by a lower surface of the angled ledge.

10. The lid and blade assembly of claim 1, wherein the lid is coupleable to a beaker of the micro puree machine.

11. The lid and blade assembly of claim 1, wherein the blade comprises a unitary structure.

12. The lid and blade assembly of claim 1, wherein the lid further comprises a release lever arm for engaging the at least one retaining component.

13. The lid and blade assembly of claim 1, wherein the engagement surface extends radially outward at a 90-degree angle relative to a central axis of the central support hub.

* * * * *